Nov. 25, 1958   R. M. BARNARD ET AL   2,861,321
MANUFACTURE OF ELECTRICAL CAPACITORS
Filed Dec. 14, 1953
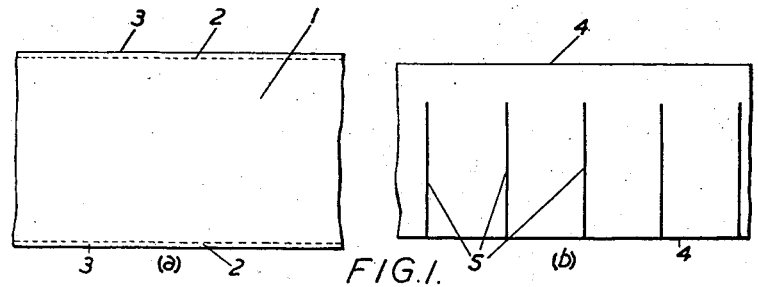
FIG.1.
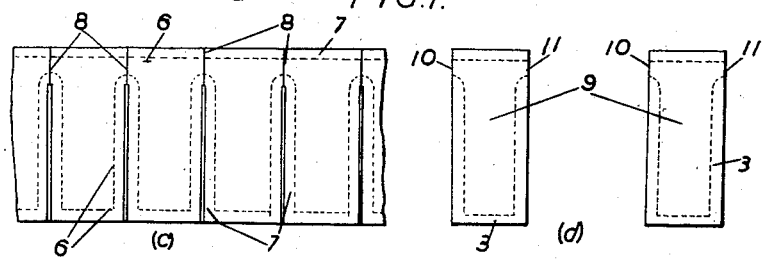
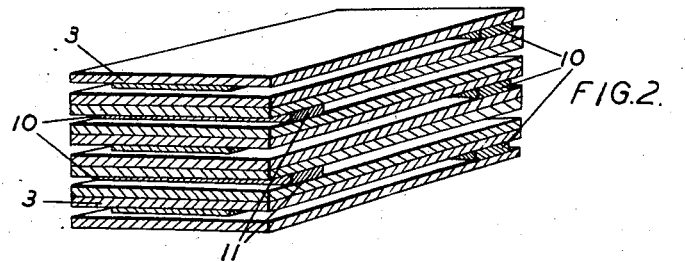
FIG.2.
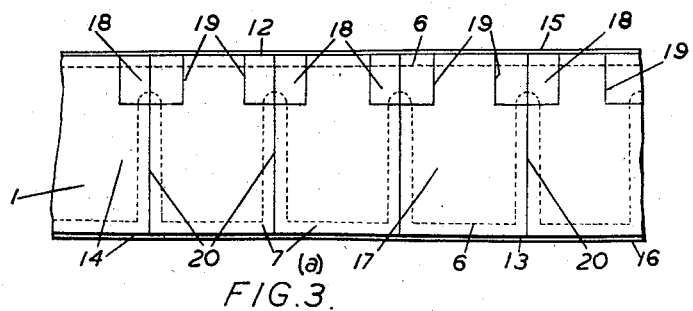
FIG.3.
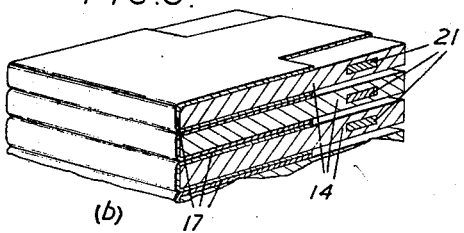
Inventor
R.M. BARNARD — D. GIRLING
N. C. JUDD
By Philip M. Bolton
Attorney

United States Patent Office 2,861,321
Patented Nov. 25, 1958

2,861,321
MANUFACTURE OF ELECTRICAL CAPACITORS

Roy Mayne Barnard, Douglas Stacey Girling, and Nigel Cecil William Judd, London, England, assignors to International Standard Electric Corporation, New York, N. Y.

Application December 14, 1953, Serial No. 397,826

Claims priority, application Great Britain November 14, 1952

3 Claims. (Cl. 29—25.42)

This invention relates to the manufacture of electrical capacitors, comprising a conductor coated with an insulating material.

During the coating process it is found that there is a tendency for the insulating material to retract from the edges of the conductor. It is already known to coat a conductor with an insulating material, to trim off the edges, and then to dissolve a portion of the exposed edges, and to leave the insulating material overlapping the edges of the conductor in order to increase the path between conductors, when they are laid together as electrodes in a capacitor.

A method of manufacture of an electrode in which this dissolving process is used is described in our U. S. application Serial No. 374,756, filed August 17, 1953; this method comprises the steps of coating a conductor with insulating material, dissolving any uncoated portions of the conductor, coating again completely, and then cutting the conductor in two parts along its length so that one edge of each part is uncoated and the remainder of each conductor is completely coated by insulating material. Electrical connections can then easily be made to the uncoated edges, formed by the cutting in two of the conductor.

Although this method is very suitable for the manufacture of electrodes of the continuous foil type, it is not applied so easily to the manufacture of large numbers of electrodes for use in capacitors of the stack type.

According to the present invention there is provided a method of manufacture of electrical capacitors comprising the steps of applying a coating of insulating material to a conductor, cutting slits in the conductor at intervals along its length, dissolving any exposed portions of the conductor, and cutting the conductor into separate sections by continuing the said slits to the edges of the conductor.

Embodiments of the invention will now be described with reference to the accompanying drawing in which Fig. 1 shows stages in the production of electrodes, Fig. 2 shows a stack of these electrodes, and Fig. 3 shows a stack of electrodes with a second electrode formed by a metal coating on an insulating coating.

Referring to Fig. 1, a plan view is shown in (*a*) of a conductor 1 bounded by the dotted lines 2 and coated by a layer of some insulating material 3. Since the coating is not always even at the edges of the conductor, the edges 4 have been trimmed in (*b*) to expose the conductor and slits 5 have been made at regular intervals along the length of the conductor. The metal of the electrode is thus exposed along each edge and at each slit. The electrode is next passed through a solution which will dissolve the exposed metal edges but which will not attack the insulating material. The solution will also dissolve any of the conductor left exposed by an imperfect coating of insulating material on its surfaces.

This dissolving action produces an electrode the surfaces of which are completely coated by insulating material and the edges of which are recessed within the insulating material giving the edges of the coated electrode a channelled appearance.

In (*c*) the conductor 1 is shown after this dissolving action with its edges bounded by the dotted lines 6 and with the insulating material 3 overhanging its edges 7. The conductor is then cut along the lines 8 to produce a number of separate electrodes. In (*d*) these separate electrodes are shown with portions of their edges easily accessible at 10 and 11, and it is at these points that electrical connections to the electrodes can be made by some means, such as spraying the edges with a metallising coating.

Referring to Fig. 2 a stack of the electrodes 9 is shown with the connection points 10 and 11 of alternate electrodes arranged at opposite ends of the stack.

Between the stages (*c*) and (*d*) depicted in Fig. 1, that is, after the channelled edges have been produced and before the conductor is cut along the lines 8, a further coating of an insulating material may be given in order to fill the channelled edges and the dissolved portions of the surfaces of the conductors and so give improved protection to the edges and increase the leakage path between the electrodes, and reduce the likelihood of breakdown of insulation between electrodes.

Since a number of connection points may be provided to each electrode on opposite sides of the stack, each electrode may be connected in series in an electric circuit as described in the application of D. A. Beresford, Serial No. 334,063, filed Jan. 29, 1953. Moreover a capacitor may be assembled by stacking uncoated metal electrodes alternately with coated electrodes.

Referring to Fig. 3, there is shown at (*a*) a plan view of the conductor 1 bounded by dotted lines 6 and with the insulating material 3 bounded by the lines 12 and 13, overhanging the edges of the conductor at 7. A further coating of insulating material 14, the edges of which are indicated by the lines 15 and 16 has then been applied to the coated conductor so that the spaces, which were formed by the dissolving process, are filled by insulating material. The material 14 is then coated by a conducting layer 17 with the exception of the areas 18 bounded by the line 19.

This coated conductor is then cut into separate sections along the lines 20 to form electrodes.

In (*b*) these electrodes are shown stacked together so that the edges 21 of each electrode appear in line at the side of the stack to enable connection to be made to them when they are used as an electrode of a capacitor. The layer 17 of conducting material formed upon the insulating material 14 is then used as the other electrode of a capacitor and connection to it may be made at any point or points, since by virtue of the construction described each section is automatically connected to the adjacent sections. The layer 17 may be formed for example, by vaporisation in vacuo, spraying, passing the foil between coated rollers or any other well-known means.

It should be understood that any or all of the coatings of insulating material may be made by applying a solution of insulating material and drying to drive off the solvent and that the insulating material applied may be a non-polymerised or non-cured form of a polymerisable or curable form of artificial resin. In the latter case, after or during the driving off of the solvent, the resin may be polymerised or cured, for example, by continuing the heating required by drying or by subjecting the coated conductor to a further heating stage.

While the principles of the invention have been described above in connection with specific embodiments, and particular modifications thereof, if is to be clearly understood that this description is made only by way of example and not as a limitation on the scope of the invention.

What we claim is:

1. A method of making a multi-layer capacitor comprising applying a layer of insulation to an elongated foil conductor, cutting slits in the conductor at spaced points along its length, the slits extending transversely of the conductor from one edge towards the other but terminating short thereof, dissolving the exposed portions of the conductor, cutting the conductor into separate sections by continuing said slits to the other edge of the conductor, whereby each conductor section is recessed with respect to the insulation except where the insulation was not cut prior to the dissolving process, and stacking said sections with the edges in alignment and so that the conductor portions which were not recessed are placed successively at opposite ends of the stack.

2. A method of manufacture as claimed in claim 1, which comprises the further step of further coating the coated conductor with an insulating material after the exposed portions thereof have been dissolved in order to fill in the spaces left by the dissolving action.

3. A method of manufacture as claimed in claim 1 which comprises the further step of forming a layer of conducting material upon the coating of insulating material in order to form a second electrode.

References Cited in the file of this patent
UNITED STATES PATENTS

| | | |
|---|---|---|
| 1,479,315 | Pickard | Jan. 1, 1924 |
| 2,520,173 | Sanders | Aug. 29, 1950 |
| 2,607,825 | Eisler | Aug. 19, 1952 |